US011989728B2

(12) United States Patent
Chambers et al.

(10) Patent No.: US 11,989,728 B2
(45) Date of Patent: *May 21, 2024

(54) SYSTEMS AND METHODS FOR SECURELY TRANSMITTING CREDIT CARD PAYMENTS

(71) Applicant: STATE FARM MUTUAL AUTOMOBILE INSURANCE COMPANY, Bloomington, IL (US)

(72) Inventors: Ryan Chambers, Bloomington, IL (US); Anthony Martin, Pekin, IL (US); Dana R. Guild, Louisville, KY (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/506,839

(22) Filed: Oct. 21, 2021

(65) Prior Publication Data

US 2022/0044230 A1    Feb. 10, 2022

Related U.S. Application Data

(63) Continuation of application No. 15/609,720, filed on May 31, 2017, now Pat. No. 11,157,902, which is a
(Continued)

(51) Int. Cl.
*G06Q 20/38* (2012.01)
*G06Q 20/22* (2012.01)
*G06Q 20/24* (2012.01)

(52) U.S. Cl.
CPC ......... *G06Q 20/385* (2013.01); *G06Q 20/22* (2013.01); *G06Q 20/227* (2013.01); *G06Q 20/24* (2013.01)

(58) Field of Classification Search
None
See application file for complete search history.

(56) References Cited

U.S. PATENT DOCUMENTS 6,327,578 B1    12/2001    Linehan
7,996,288 B1    8/2011    Stolfo
(Continued)

FOREIGN PATENT DOCUMENTS

CN    104781840 A  *  7/2015    ............. G06Q 20/20
CN    105580038 A  *  5/2016    ........... G06Q 20/385
(Continued)

OTHER PUBLICATIONS

S. Sultan, A. G. Abbasi, A. Shibli and A. Nasir, "Secure protocol for financial transactions using smartphones—SPFT formally proved by A VISPA," 2014 11th International Conference on Security and Cryptography (SECRYPT). https://ieeexplore.ieee.org/document/7509514?source=IQplus (Year: 2014).*
(Continued)

*Primary Examiner* — El Mehdi Oussir
(74) *Attorney, Agent, or Firm* — MARSHALL, GERSTEIN & BORUN LLP

(57) ABSTRACT

A method and system may provide a secure credit card payment service which allows a merchant to store credit cards without storing credit card data on merchant servers. The customer, via a web-enabled device, transmits a request to register a credit card and receives from the merchant server, a credit card registration webpage where the customer may provide credit card data and customer data. In response to receiving the credit card data and the customer data, the web-enabled device transmits the credit card data to a token server that stores the credit card data and receives a token from the token server. In response to receiving the token, the web-enabled device transmits the token and the
(Continued)

customer data to the merchant server for processing subsequent credit card payment transactions.

18 Claims, 9 Drawing Sheets

Related U.S. Application Data continuation of application No. 14/505,599, filed on Oct. 3, 2014, now Pat. No. 9,697,517.

(56) References Cited

U.S. PATENT DOCUMENTS

| | | | |
|---|---|---|---|
| 8,108,977 B1* | 2/2012 | Miller | G06Q 30/0633 |
| | | | 26/82 |
| 8,554,675 B2 | 10/2013 | Gupta et al. | |
| 8,694,438 B1 | 4/2014 | Jernigan et al. | |
| 8,996,423 B2 | 3/2015 | Johnson et al. | |
| 9,092,776 B2 | 7/2015 | Dessert | |
| 9,830,595 B2 | 11/2017 | Anderson et al. | |
| 9,830,596 B2 | 11/2017 | Collison et al. | |
| 10,007,903 B1* | 6/2018 | Gailloux | G06Q 30/0267 |
| 2005/0102188 A1 | 5/2005 | Hutchison et al. | |
| 2006/0235795 A1* | 10/2006 | Johnson | G06Q 20/02 |
| | | | 705/26.1 |
| 2007/0136193 A1 | 6/2007 | Starr | |
| 2008/0059375 A1* | 3/2008 | Abifaker | G06Q 20/327 |
| | | | 705/44 |
| 2010/0030697 A1 | 2/2010 | Goodrich et al. | |
| 2010/0257612 A1 | 10/2010 | McGuire et al. | |
| 2012/0041881 A1 | 2/2012 | Basu et al. | |
| 2012/0136796 A1 | 5/2012 | Hammad et al. | |
| 2012/0265631 A1 | 10/2012 | Cronic et al. | |
| 2012/0290376 A1* | 11/2012 | Dryer | G06Q 20/385 |
| | | | 705/14.23 |
| 2014/0019358 A1* | 1/2014 | Priebatsch | G06Q 20/3274 |
| | | | 705/44 |
| 2014/0074637 A1* | 3/2014 | Hammad | G06Q 20/326 |
| | | | 705/41 |
| 2014/0108263 A1 | 4/2014 | Ortiz et al. | |
| 2014/0136419 A1* | 5/2014 | Kiyohara | G06Q 20/40145 |
| | | | 705/67 |
| 2014/0164241 A1 | 6/2014 | Neuwirth | |
| 2014/0344153 A1* | 11/2014 | Raj | G06Q 20/3821 |
| | | | 705/44 |
| 2017/0046679 A1 | 2/2017 | Gotlieb et al. | |
| 2017/0098264 A1* | 4/2017 | Priebatsch | H04L 67/52 |
| 2019/0281030 A1* | 9/2019 | Isaacson | H04L 63/0838 |
| 2020/0082402 A1 | 3/2020 | Patel et al. | |
| 2021/0174426 A1* | 6/2021 | Isaacson | G06Q 20/12 |

FOREIGN PATENT DOCUMENTS

| | | | | |
|---|---|---|---|---|
| GB | 2524030 A | * | 9/2015 | G06Q 20/0453 |
| KR | 20130070509 A | * | 10/2012 | |
| KR | 101611796 B1 | * | 7/2015 | |
| WO | WO-2007123596 A1 | * | 11/2007 | G06F 21/10 |
| WO | WO-2012151590 A2 | * | 11/2012 | G06Q 20/20 |
| WO | WO-2015039254 A1 | * | 3/2015 | G06Q 20/3224 |

OTHER PUBLICATIONS

CyberSource Secure Acceptance Silent Order Post, Oct. 2014, CyberSource, http://apps.cybersource.com/library/documentation/dev_guides/Secure_Acceptance_SOP/html/wwhelp/wwhimpl/js/html/wwhelp.htm#href=coverAPI.html<http://apps.cybersource.com/library/documentation/dev_guides/Secure_Acceptance_SOP/html/wwhelp/wwhimpl/js/html/wwhelp.htm>.

CyberSource Secure Acceptance Web/Mobile, Sep. 2014, CyberSource, http://apps.cybersource.com/library/documentation/dev_guides/Secure_Acceptance_WM/html/wwhelp/wwhimpl/js/html/wwhelp.htm#href=coverSC.html<http://apps.cybersource.com/library/documentation/dev_guides/Secure_Acceptance_WM/html/wwhelp/wwhimpl/js/html/wwhelp.htm>.

Kitten, T. (Jun. 25, 2013). Bank Info Security. Retrieved from <http://www.3dsi.com/about-3dsi/press-room/press-releases/3delta-systems-applauds-visas-tokenization-best-practices-for-p>.

Capas, A. (Jun. 19, 2010). 3 Delta Systems. 3Delta Systems Applauds Visa's Tokenization Best Practices for Preventing Credit Card Data Breaches.

Office Action issued in U.S. Appl. No. 14/505,599 dated Dec. 1, 2014.

Office Action issued in U.S. Appl. No. 14/505,599 dated Mar. 27, 2015.

Office Action issued in U.S. Appl. No. 14/505,599 dated Jul. 1, 2015.

Office Action issued in U.S. Appl. No. 14/505,599 dated Dec. 31, 2015.

Office Action issued in U.S. Appl. No. 14/505,599 dated Jul. 29, 2016.

Office Action issued in U.S. Appl. No. 14/505,599 dated Dec. 22, 2016.

Office Action issued in U.S. Appl. No. 15/609,720 dated Mar. 25, 2020.

Office Action issued in U.S. Appl. No. 15/609,720 dated Oct. 2, 2020.

* cited by examiner

340

```
┌─────────────────────────────┐
│ ..ıl CARRIER 3G    4:20PM ▭ │
│ ⌂   State Farm              │
├─────────────────────────────┤
│     Select a Credit/Debit Card │
│                             │
│   Red Card      Master Card │
│   xxxxxxxxxxxxx             │
│                             │
│   Blue Card     VISA        │
│   xxxxxxxxxxxxx             │
│                             │
│   Black Card    Discover    │
│   xxxxxxxxxxxxx             │
│                             │
│                             │
│   ┌───────────────────────┐ │
│   │  Add Credit/Debit Card│ │
│   └───────────────────────┘ │
└─────────────────────────────┘
```

342 — Red Card
344 — Blue Card
346 — Black Card
348 — Add Credit/Debit Card

362, 370 — Date: February, 28, 2014
364 — Auto Insurance Premium
366 — Amount: $80.00
368 — Payment Method: Red Card xxxxxxxx
372 — Submit Payment

*FIG. 3D*

SYSTEMS AND METHODS FOR SECURELY TRANSMITTING CREDIT CARD PAYMENTS

CROSS-REFERENCE TO RELATED APPLICATIONS

This application is a continuation of and claims priority to U.S. application Ser. No. 15/609,720 filed on May 31, 2017, entitled "System and Method for Secure Acceptance of Customer Credit Card Numbers," which is a continuation of U.S. application Ser. No. 14/505,599 filed on Oct. 3, 2014, entitled "System and Method for Secure Acceptance of Customer Credit Card Numbers," the entire contents of which are hereby expressly incorporated herein by reference.

TECHNICAL FIELD

The present disclosure generally relates to a system and method for securely accepting credit card payments and, more particularly to a method and system for accepting future credit card payments using previously stored credit cards without storing credit card data on a merchant server.

BACKGROUND

Today, customers pay for a variety of products using online payment systems. The online payment systems may allow a customer to store credit card information for future use when buying products at a later date. However, storing credit card information puts a customer at risk, because hackers may break into the online payment systems and take the credit card information. To combat this problem, several credit card companies established the Payment Card Industry Data Security Standard (PCI-DSS) which compels merchants that store, process, or transmit cardholder data (CAD) and/or sensitive authentication data (SAD) to meet a specific set of requirements. According to PCI-DSS requirements, any merchant that stores, processes or transmits a credit card number, a cardholder name in conjunction with the credit card number, a service code in conjunction with the credit card number, or an expiration date in conjunction with the credit card number must comply with a series of technical guidelines.

SUMMARY

To accept credit card payments in a secure manner, a secure credit card payment system implemented in a merchant server may allow for a user to store a credit card for making future credit card payments. However, when the user selects a credit card to store, the merchant server may only receive customer data related to the credit card, such as a nickname for the credit card, a billing address including a zip code, a billing phone number, a credit card company that issued the credit card, etc. The credit card data such as a credit card number, a credit card expiration date, a credit card service code, etc., may instead be sent to a separate server which is not directly accessible from the merchant server and may be owned by a third party. The separate server then may generate a token to represent the credit card data for a credit card, and the merchant server may store the token with the customer data. This token may be used by the merchant server instead of credit card data when the customer selects the corresponding credit card for a later payment. In this manner, merchants may be outside the scope of PCI-DSS requirements or within a reduced scope because credit card data is not stored at the merchant servers. Therefore, the secure credit card payment system is efficient and cost effective for merchants, because of the reduced PCI scope. Moreover, this technique can improve the security of storing credit card information.

In an embodiment, a method of securely transmitting credit card payments is provided. The method includes transmitting, by a web-enabled device to a merchant server, a request to register a credit card and in response to transmitting the request, receiving, at the web-enabled device from the merchant server, a credit card registration webpage, the credit card registration webpage including at least: a first entry field for entering credit card data, a second entry field for entering customer data for the credit card, and a submit button for submitting at least the credit card data and the customer data. The method further includes displaying, by the web-enabled device the credit card registration webpage, receiving, from the user at the displayed credit card registration webpage, the credit card data and the customer data, and receiving, from the user, a selection of the submit button on the displayed credit card registration webpage. In response to receiving a selection of the submit button by the user, the method includes transmitting, by the web-enabled device to a token server, the credit card data, where the credit card data is not sent to the merchant server, the token server stores the credit card data and generates a token representing the credit card data, and the token server is not directly accessible by the merchant server and receiving, at the web-enabled device from the token server, the generated token. In response to receiving the generated token, the method includes transmitting, by the web-enabled device to the merchant server, the token and the customer data, the token being associated with the customer data and stored at the merchant server for processing subsequent credit card payments.

In another embodiment, a web-enabled device for securely transmitting credit card payments is provided. The web-enabled device includes one or more processors and a non-transitory computer-readable memory coupled to the one or more processors and storing instructions thereon. When executed by the one or more processors, the instructions cause the web-enabled device to transmit, to a merchant server, a request to register a credit card, and in response to transmitting the request, receive, from the merchant server, a credit card registration webpage, the credit card registration webpage including at least: a first entry field for entering credit card data, a second entry field for entering customer data for the credit card, and a submit button for submitting at least the credit card data and the customer data. The instructions further cause the web-enabled device to display the credit card registration webpage, receive, from the user at the displayed credit card registration webpage, the credit card data and the customer data, and receive, from the user, a selection of the submit button on the displayed credit card registration webpage. In response to receiving a selection of the submit button by the user, the instructions cause the web-enabled device to: response to receiving a selection of the submit button by the user, transmit, to a token server, the credit card data, where the credit card data is not sent to the merchant server, the token server stores the credit card data and generates a token representing the credit card data, and the token server is not directly accessible by the merchant server and receive, from the token server, the generated token. In response to receiving the generated token, the instructions cause the web-enabled device to transmit, to the merchant server, the token and the customer data, the token being associated with the customer data and stored at the merchant server for processing subsequent credit card payments.

In yet another embodiment, non-transitory computer-readable memory is provided. The non-transitory computer-readable memory stores instructions thereon that when executed by one or more processors in a web-enabled device, cause the web-enabled device to transmit, to a merchant server, a request to register a credit card, and in response to transmitting the request, receive, from the merchant server, a credit card registration webpage, the credit card registration webpage including at least: a first entry field for entering credit card data, a second entry field for entering customer data for the credit card, and a submit button for submitting at least the credit card data and the customer data. The instructions further cause the web-enabled device to display the credit card registration webpage, receive, from the user at the displayed credit card registration webpage, the credit card data and the customer data, and receive, from the user, a selection of the submit button on the displayed credit card registration webpage. In response to receiving a selection of the submit button by the user, the instructions cause the web-enabled device to: response to receiving a selection of the submit button by the user, transmit, to a token server, the credit card data, where the credit card data is not sent to the merchant server, the token server stores the credit card data and generates a token representing the credit card data, and the token server is not directly accessible by the merchant server and receive, from the token server, the generated token. In response to receiving the generated token, the instructions cause the web-enabled device to transmit, to the merchant server, the token and the customer data, the token being associated with the customer data and stored at the merchant server for processing subsequent credit card payments.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3C depicts an exemplary credit card selection screen of a client application in accordance with the presently described embodiments;

FIG. 3D depicts an exemplary order review screen of a client application in accordance with the presently described embodiments;

DETAILED DESCRIPTION

Figure 1:
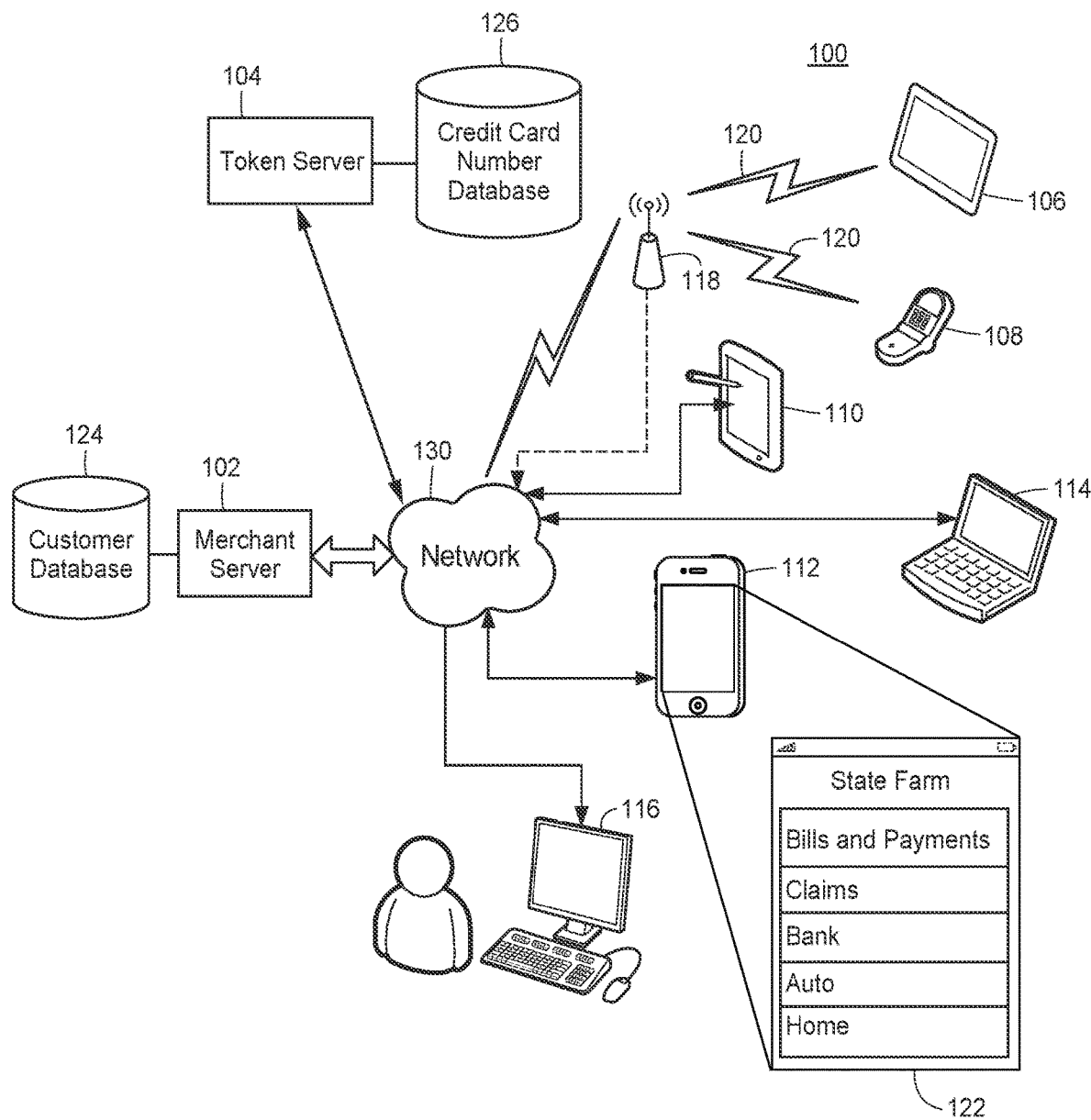
FIG. 1 illustrates a block diagram of a computer network and system on which an exemplary secure credit card payment system and method may operate in accordance with the described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "credit card data," as used herein, may be used to refer to any information related to a credit card which is in scope for PCI-DSS requirements. According to PCI-DSS, this information includes cardholder data such as a credit card number, a credit cardholder name stored in conjunction with a credit card number, a service code stored in conjunction with a credit card number and a credit card expiration date stored in conjunction with a credit card number.

As used herein, the term "customer data" may be used to refer to information related to a credit card or information related to a customer which can be stored by a merchant and is out of scope or at a reduced scope for PCI-DSS requirements. For example, a nickname for the credit card, a billing address including a zip code, a billing phone number, a credit card company that issued the credit card, a client identification (ID) name and/or number (also referred to herein as "client ID"), a payment amount, and an insurance policy number may be related to the use of a credit card or to the customer, but storing this information alone may not be in scope for PCI-DSS requirements. However, this is not an exclusive list and other information related to a credit card which is not considered in scope for PCI-DSS requirements may also be referred to as "customer data."

Generally speaking, when a user stores a credit card using the secure credit card payment system, a merchant server may receive customer data related to the credit card and may store the customer data in a customer profile which may be accessed with a client ID. For example, the merchant server may store one or more instances of customer data each related to a separate credit card, in a customer profile associated with a stored client ID. However, the merchant server may not receive a credit card number, a credit card expiration date or a credit card service code. Instead, this information may be sent directly to a separate server, which is not directly accessible from the merchant server. The separate server may store the credit card data and may generate a token, which is a string of randomly generated alphanumeric or numeric characters that represent the credit card data. The token may be stored at the separate server along with the credit card data. It also may be sent to the merchant server and stored with the customer data corresponding to the credit card. When a user wants to make a payment using the stored credit card, the user may log in to an online payment account using a client ID stored at the merchant server. The merchant server then may transmit a web page which may include one or more instances of customer data, each instance of customer data corresponding to a separate credit card and including a nickname. The merchant server may also transmit a token associated with each particular instance of customer data and corresponding to the same credit card as the particular instance of customer data. In some embodiments, the token may not be displayed on the web page. The user then may select one of the instances of customer data, by for example, selecting one of the nicknames. As a result, the respective token corresponding to the same credit card as the selected nickname may be sent to the token server. The separate server may determine the credit card data represented by the respective token to find the appropriate credit card for the payment.

FIG. 1 illustrates various aspects of an exemplary environment implementing a secure credit card payment system 100. In particular, FIG. 1 illustrates a block diagram of the secure credit card payment system 100. The environment 100 includes a merchant server 102, a token server 104, and a plurality of client devices 106-116 which may be communicatively connected through a network 130, as described below. According to embodiments, both the merchant server 102 and the token server 104 can be a combination of hardware and software components, as described in more detail below. The merchant server 102 can have an associated database 124 for storing data related to the operation of the secure credit card payment system 100 (e.g., a customer profile including a client ID such as a customer username and a customer password and one or more instances of customer data, each instance including a customer credit card nickname, a customer billing address, a customer phone number, a token representing a customer credit card number, a credit card company that issued the credit card, etc.). The token server 104 can also have an associated database 126 for storing data related to the operation of the secure credit card payment system 100 (e.g., credit card data including a credit card number, a credit card expiration date, and a credit card service code, a token representing a credit card number, etc.).

The client devices 106-116 may include, by way of example, a tablet computer 106, a cell phone 108, a personal digital assistant (PDA) 110, a mobile device smart-phone 112 also referred to herein as a "mobile device," a laptop computer 114, a desktop computer 116, a portable media player (not shown), a home phone, etc. Of course, any client device appropriately configured may interact with the secure credit card payment system 100. The client devices 106-116 need not necessarily communicate with the network 130 via a wired connection. In some instances, the client devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

Each of the client devices 106-116 may interact with the merchant server 102 to receive web pages or server data from the merchant server 102 and may display the web pages or server data via a client application or an Internet browser (described below). For example, the mobile device 112 may display a menu screen 122 of the client application or of a merchant website to a user, may receive an input from the user, and may interact with the merchant server 102 depending on the type of user-specified input. It will be appreciated that although only one merchant server 102 is depicted in FIG. 1, multiple merchant servers 102 may be provided for the purpose of distributing server load, serving different web pages, etc. These multiple merchant servers 102 may include a web server, an entity-specific server (e.g. an Apple® server, etc.), a server that is disposed in a retail or proprietary network, etc.

Each of the client devices 106-116 may also interact with the token server 104, for example, to transmit credit card data or to receive a token representing the credit card data. It will be appreciated that although only one token server 104 is depicted in FIG. 1, multiple token servers 104 may be provided for the purpose of distributing server load. These multiple token servers 104 may include a server that is disposed in a retail or proprietary network, an independent third-party server that is not under the control of the entity, etc.

The merchant server 102 may communicate with the token server 104 via the network 130. However, the merchant server 102 may be excluded from communication with the token server 104 by configuration or by limiting access due to security concerns. For example, the merchant server 102 may be excluded from direct access to the token server 104. In some embodiments, the merchant server 102 may communicate with the token server 104 via the network 130, but digital access rights, IP masking, and other network configurations may deny access to the merchant server 102.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol.

Figure 2A:
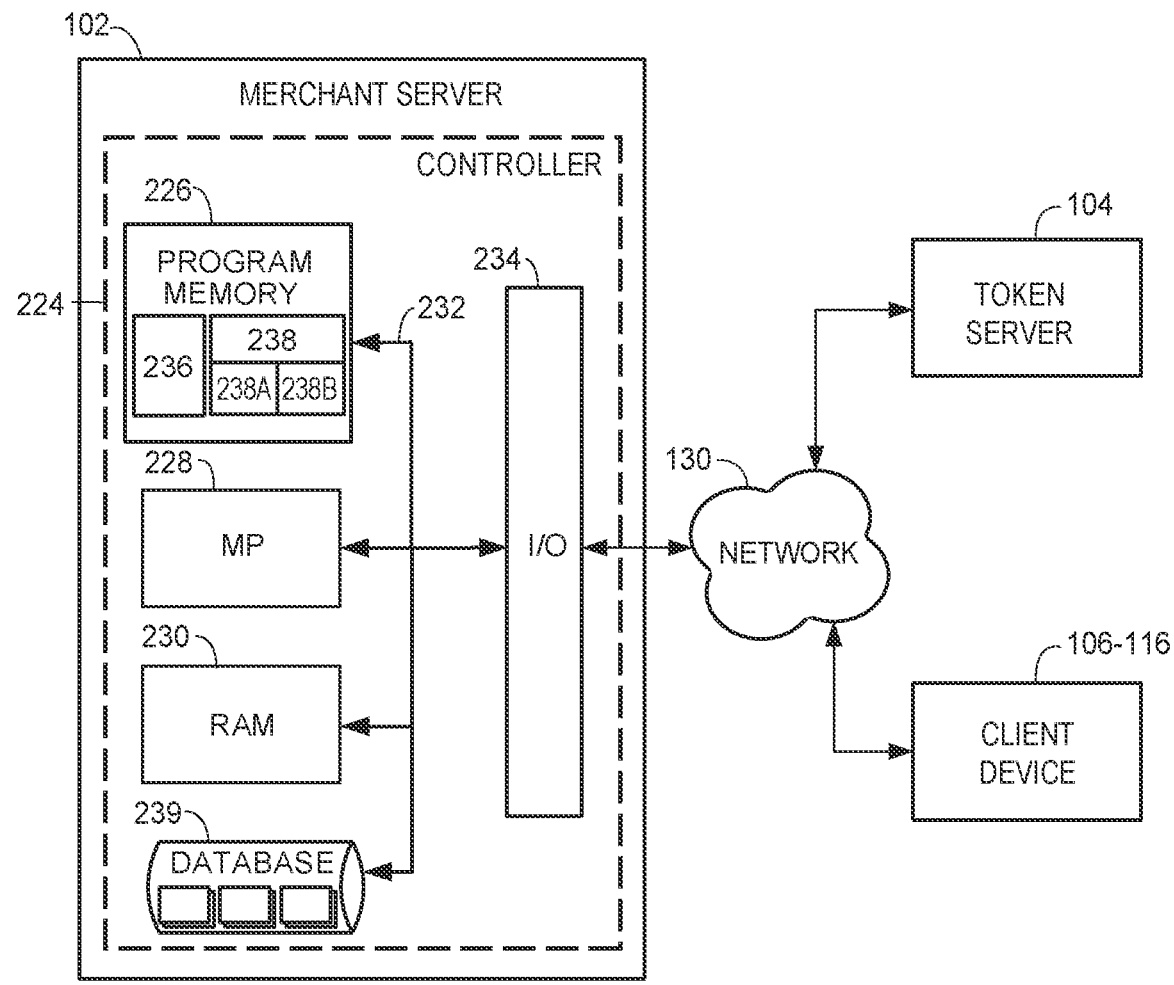
FIG. 2A illustrates a block diagram of an exemplary merchant server.

Turning now to FIG. 2A, the merchant server 102, may include a controller 224. The controller 224 includes a program memory 226, a microcontroller or a microprocessor (MP) 228, a random-access memory (RAM) 230, and an input/output (I/O) circuit 234, all of which are interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data necessary to interact with the user through the network 130. It should be appreciated that although FIG. 2A depicts only one microprocessor 228, the controller 224 may include multiple microprocessors 228. Similarly, the memory of the controller 224 may include multiple RAMs 230 and multiple program memories 226. Although the FIG. 2A depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the merchant server 102, which user interface may, for example, allow a network administrator to configure, troubleshoot, or test various aspects of the server's operation, or otherwise to access information thereon. A server application 238 operates to populate and transmit client application data and web pages to the client devices 106-116, and receive information from the user transmitted back to the merchant server 102, as described below. The server application 238 may be a single module 238 or a plurality of modules 238A, 238B. While the server application 238 is depicted in FIG. 2A as including two modules, 238A and 238B, the server application 238 may include any number of modules accomplishing tasks related to implantation of the merchant server 102. By way of example, the module 238A may populate and transmit the client application data, while the module 238B may receive and evaluate inputs from the user to store customer data.

Figure 2B:
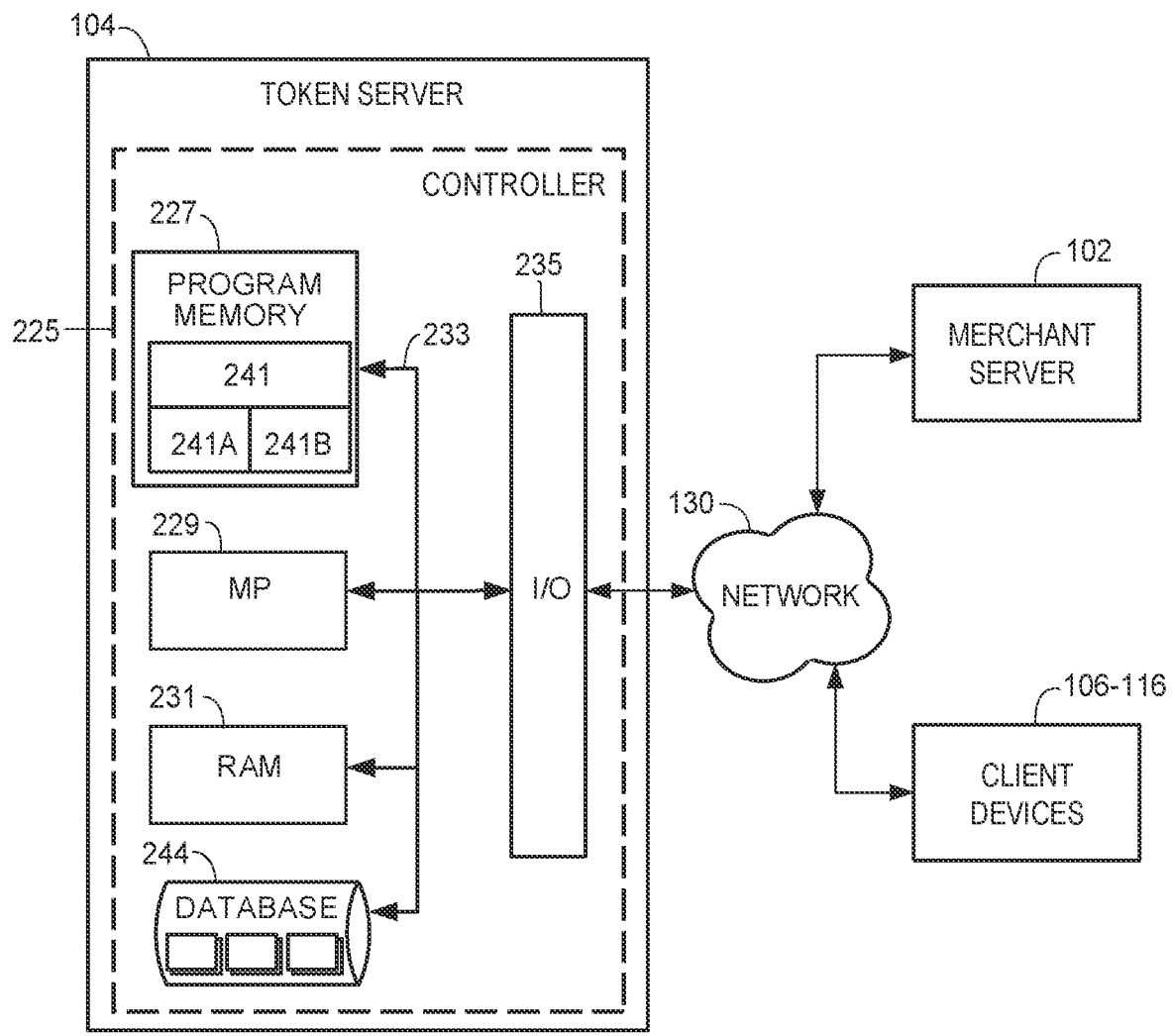
FIG. 2B illustrates a block diagram of an exemplary token server.

Turning now to FIG. 2B, the token server 104, may include a controller 225. The controller 225 includes a program memory 227, a microcontroller or a microprocessor (MP) 229, a random-access memory (RAM) 231, and an input/output (I/O) circuit 235, all of which are interconnected via an address/data bus 233. In some embodiments, the controller 225 may also include, or otherwise be communicatively connected to, a database 244 or other data storage mechanism (e.g., one or more hard disk drives, optical storage drives, solid state storage devices, etc.). The database 244 may include data such as customer credit card data, tokens, and other data necessary to interact with the user through the network 130. It should be appreciated that although FIG. 2B depicts only one microprocessor 229, the controller 225 may include multiple microprocessors 229. Similarly, the memory of the controller 225 may include multiple RAMs 231 and multiple program memories 227. Although FIG. 2B depicts the I/O circuit 235 as a single block, the I/O circuit 235 may include a number of different types of I/O circuits. The controller 225 may implement the RAM(s) 231 and the program memories 227 as semiconductor memories, magnetically readable memories, and/or optically readable memories, for example.

As shown in FIG. 2B, the program memory 227 and/or the RAM 231 may store various applications for execution by the microprocessor 229. A server application 241 operates to populate and transmit client application data and receive information from the user transmitted back to the token server 104, as described below. The server application 241 may be a single module 241 or a plurality of modules 241A, 241B. While the server application 241 is depicted in FIG. 2B as including two modules, 241A and 241B, the server application 241 may include any number of modules accomplishing tasks related to implantation of the token server 104. By way of example, the module 241A may transmit the tokens representing credit card data and/or may receive and evaluate inputs from the user to store credit card data, while the module 241B may communicate with the mobile device 112 (or any of the client devices 106-116) to fulfill a credit card payment request.

In some embodiments the token server 104 of FIG. 2B may be owned by a third party entity separate from the merchant. In other embodiments, the token server 104 may be owned by the same merchant as the merchant server 102, but the token server 104 is not accessible from the merchant server 102. Additionally, the security for the token server 104 may be enhanced compared to the security for the merchant server 102, and the token server 104 may include additional firewalls. In some embodiments, the token server 104 may be maintained in a PCI-DSS compliant manner.

Figure 2C:
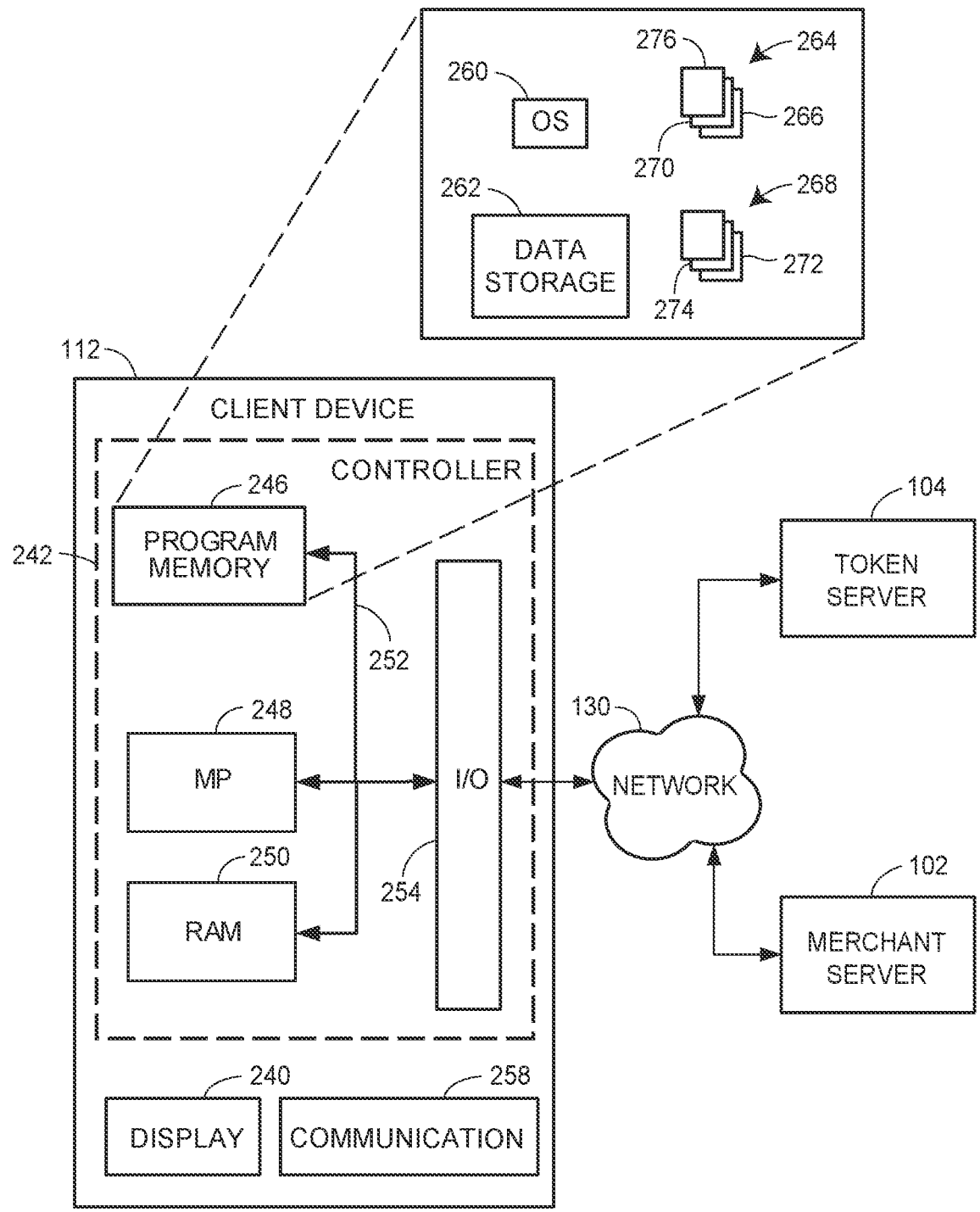
FIG. 2C illustrates a block diagram of an exemplary mobile device.

Referring now to FIG. 2C, the mobile device 112 (or any of the client devices 106-116) may include a display 240, a communication unit 258, a user-input device (not shown), and, like the merchant server 102, a controller 242. Similar to the controller 224, the controller 242 may include a program memory 246, one or more microcontroller or a microprocessor (MP) 248, a random-access memory (RAM) 250, and an input/output (I/O) circuit 254, all of which are interconnected via an address/data bus 252. The program memory 246 may include an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles, application data for the plurality of applications 264, routine data for the plurality of routines 268, and other data necessary to interact with the merchant server 102 or the token server 104 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 112.

The communication unit 258 may communicate with the merchant server 102 and the token server 104 via any suitable wireless communication protocol network, such as a wireless telephony network (e.g., GSM, CDMA, LTE, etc.), a wi-fi network (802.11 standards), a WiMAX network, a Bluetooth network, etc. The user-input device (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. As discussed with reference to the controller 224, it should be appreciated that although FIG. 2C depicts only one microprocessor 248, the controller 242 may include multiple microprocessors 248. Similarly, the memory of the controller 242 may include multiple RAMs 250 and multiple program memories 246. Although the FIG. 2C depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 112. One of the plurality of applications 264 may be a native application or web browser 270, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the merchant server 102 and the token server 104 while also receiving inputs from the user. Another application of the plurality of applications may include an embedded web browser 276 that may be implemented as a series of machine-readable instructions for receiving, interpreting, and displaying web page information from the servers 102 or 104. One of the plurality of routines may include a credit card storage routine 272 that receives customer and credit card data from a user and transmits the customer data to the merchant server 102 and the credit card data to the token server 104. Another routine in the plurality of routines may include a credit card payment routine 274 that receives a selection of a nickname corresponding to a previously stored credit card, from a user, and transmits a token corresponding to the same credit card as the nickname to the token server 104.

Preferably, a customer or a user may launch the client application 266 from a client device, such as one of the client devices 106-116, to communicate with the merchant server 102 and the token server 104 to implement the secure credit card payment system 100. Additionally, the customer or the user may also launch or instantiate any other suitable user interface application (e.g., the native application or web browser 270, or any other one of the plurality of software applications 264) to access the merchant server 102 or the token server 104 to realize the secure credit card payment system 100.

Moreover, the customer or user may also access the merchant server 102 or the token server 104 by calling a merchant call center using a cell phone 108 or a home phone. The merchant call center may include an operator that transmits customer data to the merchant server 102 and routes the call to a call center for receiving credit card data at the token server 104. Alternatively, the merchant call center may include an automated recording which transmits customer data to the merchant server 102 and credit card data to the token server 104. As used herein, the term "customer" indicates someone purchasing a retail product or service. Moreover, the term "customer" is not limited to a single person, but may instead be any person or persons having a reason or desire to purchase one or more retail products or services. Generally, the term "user" is used when referring to a person who is operating one of the client devices 106-116 and is not exclusive of the term "customer."

In one embodiment, as shown in FIG. 2C, to access the merchant server 102, the user may execute the client application 266 on one of the web-enabled devices 106-116, such as the mobile device 112. Using the client application 266, the user may request server data (not shown) by navigating a series of client application screens, such as the menu screen 122 of the client application 266. FIGS. 3A-D depict client application pages or screens that the merchant server 102 may transmit in various embodiments of the secure credit card payment system 100. However, the screens depicted in FIGS. 3A-D are merely illustrations of an exemplary embodiment. In some embodiments, the merchant server may transmit web pages and in other embodiments the merchant server may not transmit anything to the client such as when the merchant server 102 receives customer data via a call center (as described above). In any event, the user may launch the client application 266 from one of the client devices 106-116 via any suitable manner, such as touch-selecting a client application icon (not shown) on the display 240 of the mobile device 212, double-clicking on the client application icon via a mouse of a computer 116 or a trackpad (not shown) of a laptop 114. After the user launches the client application 266, a login screen of the client application 266 may be displayed to the user on the mobile device 112.

Figure 3A:
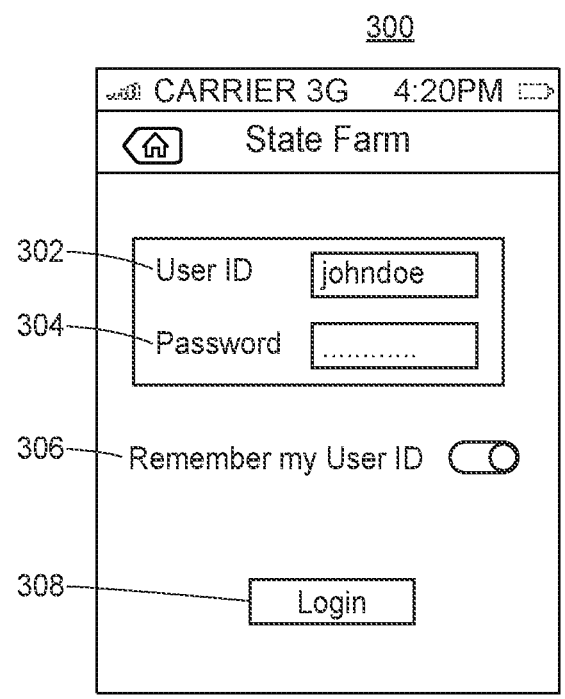
FIG. 3A depicts an exemplary login screen of a client application.

With reference now to FIG. 3A, a login screen 300 may include an area for logging in to an online payment account by entering a username 302 and a password 304. In some embodiments, the username 302 may be the same as the client ID for the user, as described above. The login screen 300 may also include an area for remembering the username 306 to avoid entering the same username the next time the user logs in to the system. Once the user enters a username and password, the user may select a "Login" button 308. After the "Login" button is selected, the merchant server 102 may verify that the username and password correspond to a customer profile from the database 124 of FIG. 1. If the username and password do not correspond to a customer profile, the login screen 300 may display an error message and prompt the user to reenter a username and password. If there is a successful match, the client application 266 may display a menu screen 320, such as that depicted in FIG. 3B.

Figure 3B:
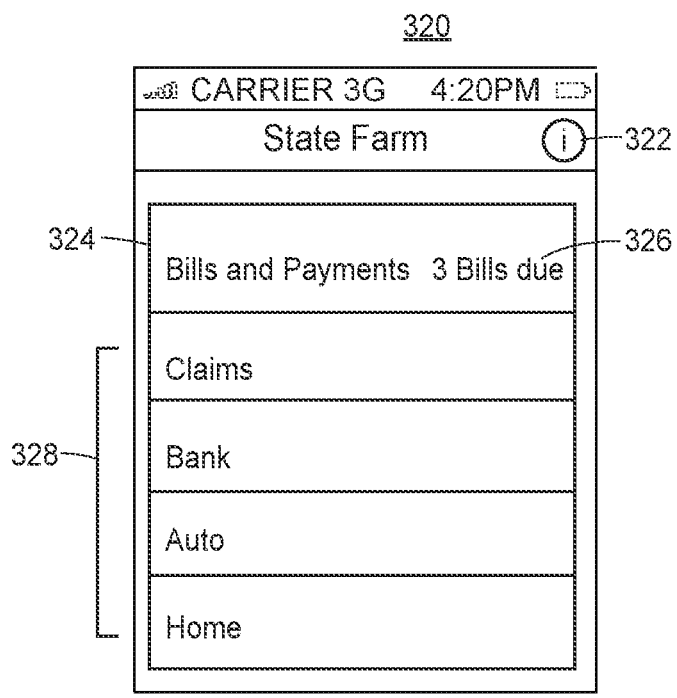
FIG. 3B depicts an exemplary menu screen of a client application in accordance with the presently described embodiments.

The menu screen 320 may include an information button 322 that causes the client application 266 to display instructions associated with the secure credit card payment system 100, or causes a web browser of the client device to navigate to a web page containing such instructions. The menu screen 320 also may include a button for "Bills and Payments" 324 and may display the number of bills due 326. The menu screen 320 may also include other menu options 328 such as online banking, an auto insurance option, an insurance claims option and a home insurance option. While the menu screen in FIG. 3B depicts insurance options and online banking options along with a bill pay option, this is merely an exemplary embodiment. In other embodiments, the menu screen may contain several options for making online payments. Moreover, while the merchandise in the exemplary embodiment is related to insurance products, any other types of merchandise may be sold in conjunction with the secure credit card payment system 100.

In any event, if the user selects the "Bills and Payments" option 324, the client application 266 may display a screen 340 as depicted in FIG. 3C. The credit card selection screen 340 may include a list of previously stored credit cards, each referred to by a credit card nickname 342, 344 and 346. The list of previously stored credit cards may include customer data corresponding to each credit card, which may be retrieved from the customer profile corresponding to the username or client ID entered on the login screen 300. For example, the first credit card in the list is referred to as "Red Card" 342 and the credit card company for the card is MasterCard®. The credit card number for the card may not be shown and instead "XXXXXXXXXXXXXXXX" may be displayed in place of the number. Alternatively, in some embodiments the last four digits of the credit card number may be displayed. In some embodiments, for each previously stored credit card, the merchant server 102 may also transmit the corresponding token to the client device 112. However, the corresponding token may not be displayed on the credit card selection screen 340. The credit card selection screen 340 may also include an option to add a credit card to the list 348. If the user selects this option, the user may be taken to a screen (not shown) with a prompt to enter credit card data and customer data. The screen may also include a "Submit" button for when the user is done entering this information. Once the user selects the "Submit" button, the customer data may be transmitted to the merchant server 102. On the other hand, the credit card data is not transmitted to the merchant server 102 and instead is sent only to the token server 104. Upon receiving the credit card data, the token server 104 may store the credit card data in a database 126 (as shown in FIG. 1) and may generate a token which represents the credit card data. The token may be a random number and can be stored with the credit card data. Moreover, the token may be a string of randomly generated alphanumeric or numeric characters. For example, the token may be a 22 digit alphanumeric character string.

In any event, the token server 104 may transmit the token to the merchant server 102, and the merchant server 102 may store the token with the customer data for the credit card in the user's customer profile which may be accessed from the user's client ID. In another embodiment, the token server 104 may transmit the token to the client device 112 and the client device 112 may transmit the token along with the customer data to the merchant server 102 for storage in the user's customer profile which may be accessed from the user's client ID.

If the user selects a nickname for a previously stored card such as "Red Card" 342, billing information as well as credit card data does not need to be entered because the customer data is automatically retrieved from the merchant server 102, as described above, and the credit card data is automatically retrieved from the token server 104. Instead, after selecting one of the previously stored credit cards, the client application 266 may display an order review screen 360 as depicted in FIG. 3D.

As FIG. 3D illustrates, the order review screen 360 may display the order information 362. The order information may include the name of the bill 364 such as "Auto Insurance Premium," the payment amount 366, the credit card nickname for the selected card 368 and the date of the payment 370. The name of the bill 364 may be included in a drop-down menu. For example, if the menu screen 320 indicates the user has three bills due, the drop-down menu may include the option to select one of the three bills. In some embodiments the payment amount may default to the full amount due for the bill. However, the user may be able to change this by entering a different amount. The order information may also include a "Submit" button 372.

When the user decides to submit the payment the token corresponding to the customer data, the payment name and the payment amount may be transmitted to the token server 104. In some embodiments, a billing zip code may also be transmitted to the token server 104. In response, the token server 104 may retrieve the credit card data represented by the token.

If the credit card is approved, the token server 104 may send a message to the merchant server 102 indicating the credit card payment is approved. The merchant server 102 may then send an order confirmation screen (not shown) to the client device 112 indicating the amount charged to the credit card, the credit card nickname and/or the last four digits of the credit card number, and that the transaction was approved. On the other hand, if the credit card is declined, the merchant server may send an error screen (not shown) indicating the credit card was declined and requesting the user to select a different credit card.

Figure 4:
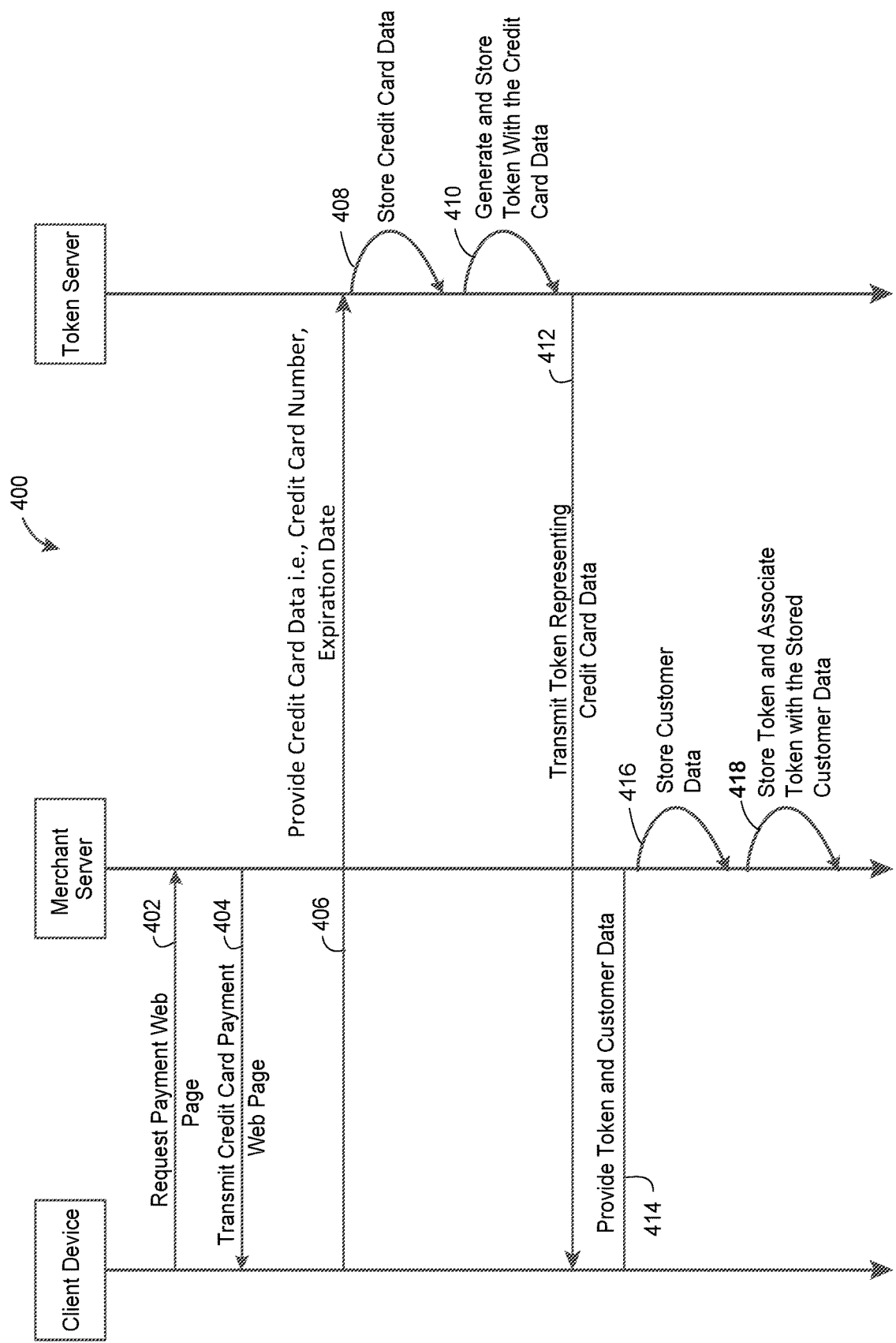
FIG. 4 depicts an exemplary interaction between the client, the merchant server and the token server when a user stores a credit card for future payments in accordance with the presently described embodiments.

FIG. 4 depicts an exemplary interaction 400 between the client device, the merchant server and the token server when a user stores a credit card for future payments. After the user logs in to the online payment account, the user requests a payment web page or application screen from the merchant server 402, by for example, selecting the "Bills and Payments" option 324 of the menu screen 320 depicted in FIG. 3B. As a result, the merchant server may transmit a credit card payment page 404 such as the credit card selection screen 340 depicted in FIG. 3C. From the credit card selection screen 340, the user selects the option to add a credit card 348 and is prompted to enter both customer data and credit card data. The credit card data may be transmitted to the token server 406 and stored there 408. The token server may then generate a token to represent the credit card data and store the token along with the credit card data 410. Then the token server may transmit the token to the client device 412 and the client device in turn may send the token and the customer data to the merchant server 414 for the merchant server to store 416 and 418 in the user's customer profile.

Figure 5:
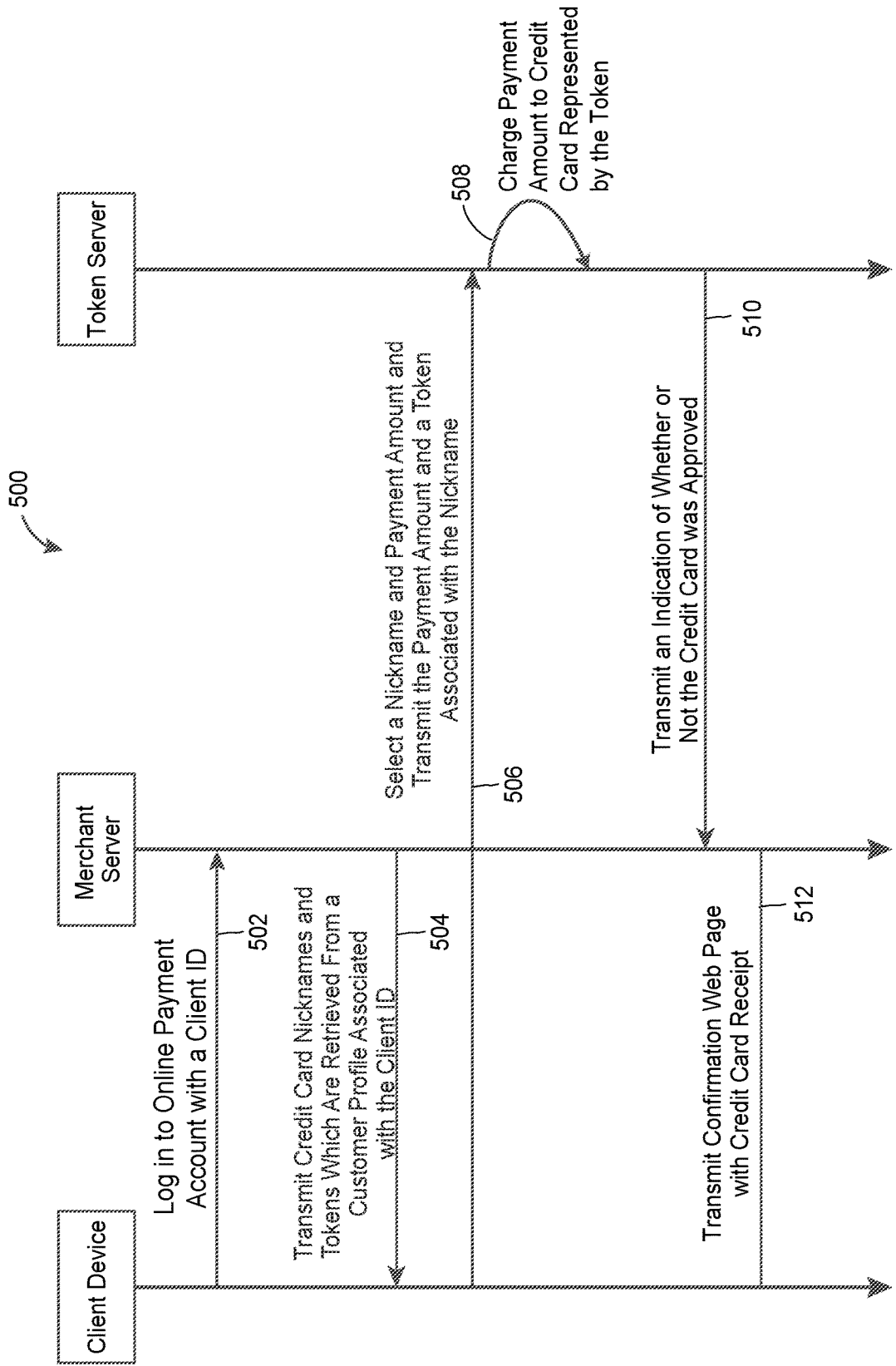
FIG. 5 depicts an exemplary interaction between the client, the merchant server and the token server when a user submits a credit card payment using a previously stored credit card in accordance with the presently described embodiments.

FIG. 5 depicts an exemplary interaction 500 between the client device, the merchant server and the token server when a user submits a credit card payment using a previously stored credit card. When the user wants to make a credit card payment, the user logs in to the online payment account using the login screen 300 as depicted in FIG. 3A (reference 502). The merchant server 102 may then retrieve one or more instances of customer data, e.g., credit card nicknames, from the customer profile associated with the user's username or client ID. The merchant server 102 may also retrieve a token corresponding to each instance of customer data, and the credit card nicknames may be transmitted to the client device via the credit card selection screen 340 as depicted in FIG. 3C (reference 504). The user may be prompted to select one of the nicknames displayed on the credit card selection screen 340, such as "Red Card," along with a payment name and a payment amount. When the user selects a nickname, the token associated with the nickname, the payment name and the payment amount may be sent to the token server 506.

The token server may retrieve the credit card data represented by the received token and charge the payment amount to the credit card number 508. Then the token server 104 may generate a message to the merchant server that the transaction is accepted 510. If the transaction is accepted, the merchant server may transmit an order confirmation screen to the client device, indicating to the user that the credit card has been charged the payment amount 512. If the transaction is declined, the merchant server may transmit an error screen to the client device requesting the user to select a different credit card or add a new one.

Figure 6:
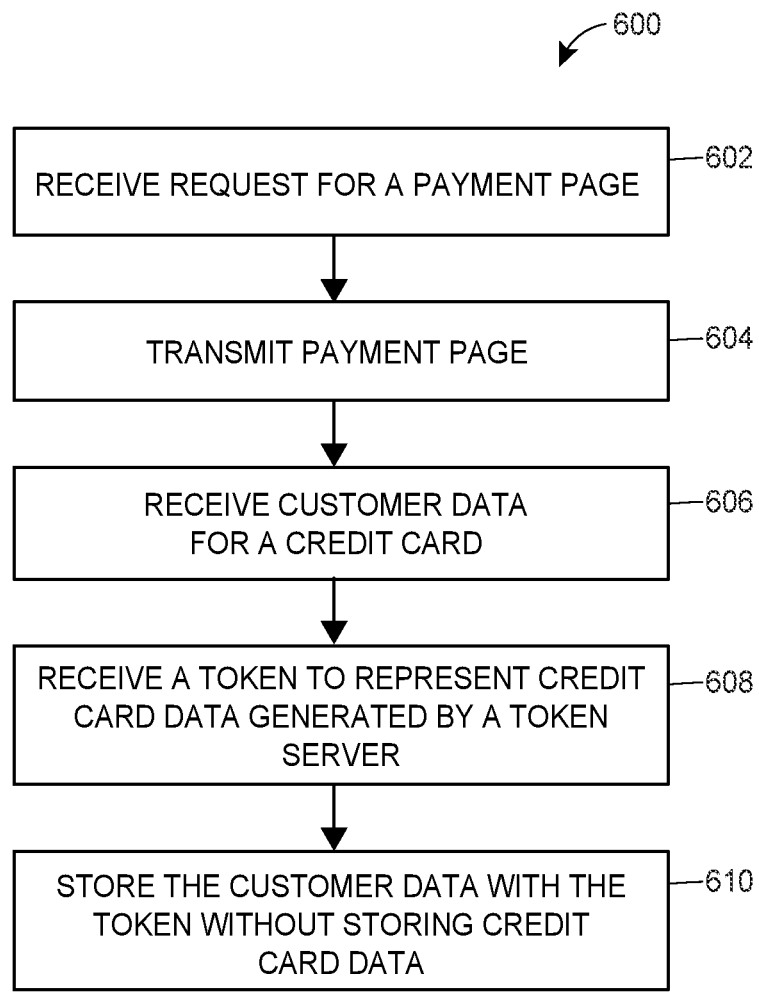
FIG. 6 depicts a flow diagram representing an exemplary merchant server-side method for implementing the secure credit card payment system in accordance with the presently described embodiments.

FIG. 6 depicts a flow diagram representing an exemplary merchant server-side method 600 for implementing the secure credit card payment system 100. The merchant server 102 receives a request for a payment page from the client device (block 602). In response, the merchant server 102 may transmit the payment page (block 604) with a prompt for the user to store a credit card to make payments. If the user decides to store a credit card, the merchant server 102 may receive customer data (block 606). The merchant server 102 also may receive a token to represent the credit card data which is generated by a token server 104 which cannot be directly accessed from the merchant server 102 (block 608). As a result, the merchant server 102 may store the customer data for a credit card with the token in the user's customer profile without storing the credit card data (block 610) so that a user can select the credit card to make a future payment.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A method of securely transmitting credit card payments, the method executed and performed by one or more computer processors, the method comprising:
    transmitting, by a web-enabled device to a merchant server using a first wireless network protocol, a request to register a credit card;
    in response to transmitting the request, receiving, at the web-enabled device from the merchant server by the first wireless network protocol, a credit card registration webpage;
    displaying, by the web-enabled device, the credit card registration webpage;
    receiving, from a user at the credit card registration webpage, (i) credit card data, (ii) customer data, and (iii) a confirmation input to submit the credit card data and the customer data;
    in response to receiving the confirmation input, transmitting, by the web-enabled device to a token server using a second wireless network protocol that is different than the first wireless network protocol, the credit card data;
    in response to receiving the credit card data, generating, at the token server, a token representing the credit card data, and the token server is not directly accessible by the merchant server;
    receiving, at the web-enabled device from the token server by the second wireless network protocol, the token; and
    in response to receiving the token, transmitting, by the web-enabled device to the merchant server by the first wireless network protocol, the token and the customer data for processing a credit card payment transaction.

2. The method of claim 1, wherein the customer data and the token are received at the web-enabled device in response to receiving a subsequent request from the user to conduct a subsequent credit card payment transaction and provided by the web-enabled device to the token server for retrieving the credit card data.

3. The method of claim 1, wherein the customer data includes at least one of a billing address, a billing phone number, a desired nickname for the credit card, or a credit card company.

4. The method of claim 1, further comprising:
    transmitting, by the web-enabled device to the merchant server using the first wireless network protocol, a subsequent request to conduct a subsequent credit card payment transaction, the subsequent request including user identification information;
    in response to transmitting the subsequent request, receiving, at the web-enabled device from the merchant server by the first wireless network protocol, one or more sets of customer data and one or more tokens associated with the user identification information;
    receiving, from the user at the web-enabled device, a selection of a set of customer data from the one or more sets of customer data;
    in response to receiving the selection of the set of customer data, transmitting, by the web-enabled device to the token server using the second wireless network protocol, a respective token of the one or more tokens associated with the set of customer data and a payment amount; and
    receiving, at the merchant server from the token server by the second wireless network protocol, an indication of whether or not the subsequent credit card payment transaction is approved.

5. The method of claim 1, wherein the credit card data includes at least one of a credit card number, a credit card expiration date, or a credit card service code.

6. The method of claim 1, wherein the token includes a 22 digit alphanumeric code.

7. The method of claim 1, wherein the token server complies with Payment Card Industry Data Security Standard (PCI-DSS) requirements.

8. The method of claim 1, wherein the first wireless network protocol includes one of (i) a wireless telephony network, (ii) a Wi-Fi network, (iii) a WiMAX network, or (iv) a long-range wireless network, and the second wireless network protocol includes one of (i) a wireless telephony network, (ii) a Wi-Fi network, (iii) a WiMAX network, or (iv) a long-range wireless network.

9. A web-enabled system for securely transmitting credit card payments, the web-enabled system comprising:
    a token server that is not directly accessible by a merchant server, wherein the token server includes:
        one or more server processors, and
        a non-transitory computer-readable server memory coupled to the one or more server processors and storing instructions thereon that, when executed by the one or more server processors, cause the token server to:

generate a token representing credit card data in response to receiving the credit card data; and a web-enabled device including:
one or more processors, and
a non-transitory computer-readable memory coupled to the one or more processors and storing instructions thereon that, when executed by the one or more processors, cause the web-enabled device to:
transmit, to a merchant server using a first wireless network protocol, a request to register a credit card,
in response to transmitting the request, receive, from the merchant server by the first wireless network protocol, a credit card registration webpage,
display the credit card registration webpage,
receive, from a user at the credit card registration webpage, (i) credit card data, (ii) customer data, and (iii) a confirmation input to submit the credit card data and the customer data, and
in response to receiving the confirmation input:
transmit, to the token server using a second wireless network protocol that is different than the first wireless network protocol, the credit card data,
receive, from the token server by the second wireless network protocol, the token, and
in response to receiving the token, transmit, to the merchant server by the first wireless network protocol, the token and the customer data for processing a credit card payment transaction.

10. The web-enabled system of claim 9, wherein the customer data and the token are received at the web-enabled device in response to a subsequent request by the user to conduct a subsequent credit card payment transaction and provided by the web-enabled device to the token server for retrieving the credit card data.

11. The web-enabled system of claim 9, wherein the customer data includes at least one of a billing address, a billing phone number, a desired nickname for the credit card, or a credit card company.

12. The web-enabled system of claim 9, wherein the instructions further cause the web-enabled system to:
transmit, to the merchant server using the first wireless network protocol, a subsequent request to conduct a subsequent credit card payment transaction, the subsequent request including user identification information;
in response to transmitting the subsequent request, receive, from the merchant server by the first wireless network protocol, one or more sets of customer data and one or more tokens associated with the user identification information;
receive, from the user, a selection of a set of customer data from the one or more sets of customer data;
in response to receiving the selection of the set of customer data, transmit, to the token server using the second wireless network protocol, a respective token of the one or more tokens associated with the set of customer data and a payment amount; and
receive, from the token server by the second wireless network protocol, an indication of whether or not the subsequent credit card payment transaction is approved.

13. The web-enabled system of claim 9, wherein the credit card data includes at least one of a credit card number, a credit card expiration date, or a credit card service code.

14. The web-enabled system of claim 9, wherein the token includes a 22 digit alphanumeric code.

15. The web-enabled system of claim 9, wherein the token server complies with Payment Card Industry Data Security Standard (PCI-DSS) requirements.

16. The web-enabled system of claim 9, wherein the first wireless network protocol includes one of (i) a wireless telephony network, (ii) a Wi-Fi network, (iii) a WiMAX network, or (iv) a long-range wireless network, and the second wireless network protocol includes one of (i) a wireless telephony network, (ii) a Wi-Fi network, (iii) a WiMAX network, or (iv) a long-range wireless network.

17. The method of claim 1, wherein generating the token representing the credit card data further comprises:
generating, at the token server, the token representing the credit card data by random numeric generation.

18. The method of claim 1, wherein, transmitting the token and the customer data to the merchant server further comprises:
transmitting, by the web-enabled device to the merchant server by a third wireless network protocol, the token and the customer data for processing the credit card payment transaction, wherein the third wireless network protocol is different from the first wireless network protocol and the second wireless network protocol.

* * * * *